(12) United States Patent
Furukawa et al.

(10) Patent No.: US 8,511,224 B2
(45) Date of Patent: Aug. 20, 2013

(54) PACKING AND STEAM COOKING DEVICE AND METHOD FOR MANUFACTURING STEAM COOKING DEVICE

(75) Inventors: Kazushi Furukawa, Osaka (JP); Takao Murai, Osaka (JP); Kazuyuki Matsubayashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 613 days.

(21) Appl. No.: 12/672,261

(22) PCT Filed: Aug. 6, 2008

(86) PCT No.: PCT/JP2008/064100
§ 371 (c)(1),
(2), (4) Date: Feb. 4, 2010

(87) PCT Pub. No.: WO2009/020146
PCT Pub. Date: Feb. 12, 2009

(65) Prior Publication Data
US 2011/0146503 A1  Jun. 23, 2011

(30) Foreign Application Priority Data
Aug. 8, 2007 (JP) .................................. 2007-207067

(51) Int. Cl.
*F16J 15/16* (2006.01)
*F24C 1/00* (2006.01)
*A23L 1/00* (2006.01)
*A47J 39/00* (2006.01)

(52) U.S. Cl.
USPC .............. 99/476; 277/395; 277/402; 277/403

(58) Field of Classification Search
USPC ................... 99/476, 474, 467; 277/394, 395, 277/402, 403; 384/130, 138, 147
See application file for complete search history.

(56) References Cited

U.S. PATENT DOCUMENTS
2,415,888 A * 2/1947 Joy ................................ 277/387
(Continued)

FOREIGN PATENT DOCUMENTS
CN  101000097 A  7/2007
JP  6-41019 Y2  10/1994
(Continued)

*Primary Examiner* — Reginald L Alexander
(74) *Attorney, Agent, or Firm* — Birch, Stewart, Kolasch & Birch, LLP

(57) ABSTRACT

An insertion hole (83a) is provided in a packing (83) and a rotating shaft (81a) is inserted into the insertion hole (83a). A sliding portion (83b) forming an air clearance (83c) is provided on the outside of the packing (83). The rotating shaft (81a) is inserted into the insertion hole (83a) with a grease G applied to the circumferential surface thereof. When the rotating shaft (81a) is inserted, the grease G is shaved off by the sliding portion (83b) and a sufficient amount of the grease G is stored in the air clearance (83c). Consequently, frictional sound and heat are and thus reduced between the rotating shaft (81a) and the packing (83), the sliding portion (83b) can come into tight contact with the rotating shaft (81a), thereby enhancing airtightness.

7 Claims, 6 Drawing Sheets

(56) References Cited

U.S. PATENT DOCUMENTS

| | | | |
|---|---|---|---|
| 3,829,106 A * | 8/1974 | Wheelock | 277/570 |
| 4,427,205 A * | 1/1984 | Holzer et al. | 277/559 |
| 4,591,168 A * | 5/1986 | Holzer | 277/309 |
| 5,169,160 A * | 12/1992 | Gaskill et al. | 277/438 |
| 6,209,879 B1 * | 4/2001 | Mizunoya et al. | 277/353 |
| 6,676,132 B1 | 1/2004 | Takebayashi et al. | |
| 7,323,662 B2 * | 1/2008 | Cho et al. | 219/401 |
| 7,325,481 B2 * | 2/2008 | Helm | 99/330 |
| 2003/0173745 A1 * | 9/2003 | Kapcoe | 277/394 |

FOREIGN PATENT DOCUMENTS

| | | |
|---|---|---|
| JP | 2000-145798 A | 5/2000 |
| JP | 2001-99326 A | 4/2001 |
| JP | 2004-257473 A | 9/2004 |
| JP | 2005-351510 A | 12/2005 |
| JP | 2006-283584 A | 10/2006 |
| JP | 2006-283950 A | 10/2006 |

* cited by examiner

PACKING AND STEAM COOKING DEVICE AND METHOD FOR MANUFACTURING STEAM COOKING DEVICE

BACKGROUND OF THE INVENTION

1. Field of the Invention

The present invention relates to a steam cooking device that jets steam into a heating chamber to cook an article-to-be-heated.

2. Description of the Related Art

A conventional steam cooking device is disclosed in Patent Document 1. This conventional steam cooking device uses superheated steam as a heating medium, and an article-to-be-heated is placed on a tray disposed in a heating chamber. It is also provided with a blower fan for circulating gas inside the heating chamber. A sectional view of a conventional structure of a blower fan for steam cooking devices is shown in the sectional view of FIG. 6. As shown in FIG. 6, a blower fan 100 is provided with a motor 101 and an impeller 102. The impeller 102 is disposed inside a partition wall 110 that isolates gas present in the heating chamber from the outside. The motor 101 is disposed outside the partition wall 110. In the partition wall 110, a through hole 110a is formed, into which a packing 103 is fitted. In the packing 103, an insertion hole 103a is formed, into which a rotation shaft 101a of the motor 101 is inserted.

Patent Document 1: JP-A-2005-351510

SUMMARY OF THE INVENTION

Problems to be Solved by the Invention

However, according to the above-described conventional steam cooker, at openings at two ends of the packing 103, shaft supporting portions 103b and 103c are formed to protrude toward the inside of the openings. With this structure, when the rotation shaft 101a with grease applied to the peripheral surface thereof is inserted into the through hole 103a of the packing 103, the grease is scraped off by the shaft supporting portions 103b and 103c. As a result, the amount of grease stored inside the packing 103 is reduced, and this makes noise and heat liable to be caused by friction between the rotation shaft 101a and the packing 103. On the other hand, if the closeness of contact between the rotation shaft 101a and the packing 103 is reduce reduced by providing a space therebetween for the purpose of reducing friction noise and friction heat, air outside the partition wall 110 is more likely to flow into the inside of the partition wall 110. This deteriorates airtightness, to disadvantageously increase the oxygen concentration inside the partition wall 110 and inside the heating chamber. If the airtightness is not sufficient here, it is difficult to maintain the heating chamber in a super low-oxygen state in which the oxygen concentration is on the order of 0.1%. This results in an inconvenience that components that are easily-oxidizable in high-temperature atmosphere such as vitamin C are oxidized while food is being cooked.

In view of the above inconveniences, an object of the present invention is to provide a steam cooking device in which airtightness is improved while reducing friction between a rotation shaft and packing, and thereby a super low-oxygen state in which the oxygen concentration is on the order of 0.1% can be maintained, and a method for manufacturing such a steam cooking device. Another object of the present invention is to provide packing capable of improving closeness of contact thereof with respect to a rotation shaft that is inserted therethrough while reducing friction therebetween.

Means for Solving the Problem

To achieve the above object, according to one aspect of the present invention, a packing for holding a shaft that, in a state in which a rotation shaft is inserted into an insertion hole formed in the packing, rotatably holds the rotation shaft has the following features. That is, an inside of the insertion hole which faces the rotation shaft comprises a sliding contact portion having a surface that is in sliding contact with the rotation shaft and a surface that is not in contact with the rotation shaft, the surface that is not in contact with the rotation shaft forms a clearance an end of which in an axial direction is open, and part of the clearance extends over an outer surface of the sliding contact portion.

According to this structure, the sliding contact portion with which the rotation shaft is in sliding contact is formed in the insertion hole. The clearance one end of which in the axial direction is open is provided on the side of the outer surface of the sliding contact portion, and the sliding contact portion is supported at an end at which the clearance is not open. Grease is applied to a circumferential surface of the rotation shaft, and the rotation shaft is then inserted through the insertion hole from the side on which the clearance is open, to be in sliding contact with the sliding contact portion. Part of the grease is scraped off at an end face of the sliding contact portion to be stored in the clearance. Furthermore, a width of the sliding contact portion in an axial direction is smaller than a width of the insertion hole in an axial direction, and an inner diameter of the end face of the clearance at which the clearance is open is larger than an inner diameter of the sliding contact portion. As a result, the rotation shaft having the grease applied to its circumferential surface is inserted into the end face of the clearance at which the clearance is open, with a space therebetween, to slidingly contact the sliding contact portion.

According to the present invention, it is preferable that, in the above-structured packing, the clearance be narrow at an end face where the clearance is open.

According to the present invention, it is preferable that, in the above-structured packing, an outer surface of the clearance be an inclined surface that extends to an end face of the insertion hole. With this structure, the outer surface of the clearance is a smooth continuous surface.

According to the present invention, it is preferable that, in the above-structured packing, the outer surface of the sliding contact portion be formed as a surface inclined such that a diameter of the sliding contact portion is smaller closer to the end of the clearance at which the clearance is open.

According to the present invention, it is preferable that, in the above-structured packing, two ends of an outer surface of the packing have different shapes.

According to another aspect of the present invention, a steam cooking device is provided with the packing according to claim 1, a heating chamber having airtightness, a steam generating device that generates steam, and jets the steam into the heating chamber, a motor provided with the rotation shaft, a blower fan having an impeller rotated by the motor to circulate gas in the heating chamber, and a partition wall that has a through hole that the rotation shaft penetrates, that is located between the motor and the impeller, and that isolates the motor from circulating gas. Here, the through hole is sealed with the packing through which the rotation shaft is inserted.

According to this structure, steam generated by the steam generating device is jetted into the heating chamber. The motor of the blower fan is disposed outside the partition wall, and the impeller is disposed in a circulation passage. When the blower fan is driven, the impeller rotates to circulate the steam present in the heating chamber, whereby an article-to-be-heated is cooked. The packing having the insertion hole is fitted to the through hole formed in the partition wall, and the rotation shaft of the motor is inserted through the insertion hole to seal the through hole.

According to the present invention, it is preferable that, in the above-structured steam cooking device, the packing be disposed such that the end of the clearance at which the clearance is open is located on the motor side.

According to still another aspect of the present invention, a method for manufacturing a steam cooking device, which includes the packing according to claim 1, an airtight heating chamber, a steam generating device that generates steam and jets the steam into the heating chamber, a motor provided with the rotation shaft, a blower fan having an impeller rotated by the motor to circulate gas in the heating chamber, and a partition wall that has a through hole that the rotation shaft penetrates, that is located between the motor and the impeller, and that isolates the motor from circulating gas, the through hole being sealed with the packing through which the rotation shaft is inserted, includes steps of: applying grease to a circumferential surface of the rotation shaft; and inserting the rotation shaft, to the circumferential surface of which the grease is applied, through the packing starting at an end of the packing on a side on which the clearance is open.

Advantages of the Invention

According to the present invention, since a sliding contact portion is formed in an insertion hole of a packing, and a clearance is provided outside the sliding contact portion, part of grease applied to the circumferential surface of a rotation shaft can be scraped off to be stored in the clearance. This allows a sufficient amount of grease to be stored inside the packing, and helps alleviate grease reduction that causes friction noise and friction heat. Thus, the packing can be structured without a space between the sliding contact portion and the rotation shaft, so that the sliding contact portion and the rotation shaft are in close contact with each other, and thus the airtightness of the packing can be improved.

Also, since part of the sliding contact portion is surrounded by the clearance in the packing, if runout of the rotation shaft occurs, the sliding contact portion easily changes its shape on receiving contact pressure from the rotation shaft, to thereby cope with the runout of the rotation shaft. As a result, the sliding contact portion can be kept in close contact with the rotation shaft without increasing contact pressure when runout of the rotation shaft has occurred. This helps prevent occurrence of a gap between the rotation shaft and the sliding contact portion to further improve the airtightness of the packing, and this also helps reduce friction between the rotation shaft and the sliding contact portion when an axial runout of the rotation shaft has occurred.

Also, since the width of the sliding contact portion in the axial direction is formed smaller than the width of the insertion hole in the axial direction, generation of friction noise and friction heat can be reduced more effectively. Moreover, since the inner diameter of the end face of the insertion hole on the side on which the clearance is open is larger than the inner diameter of the sliding contact portion, grease is less prone to stick to an end face of the packing, and thus a process of wiping grease off the packing can be omitted.

Also, according to the present invention, the end face of the clearance on the side on which the clearance is open is narrow. This helps prevent leakage of grease inserted into the clearance, and also helps reduce intrusion of foreign substances into the insertion hole.

Also, according to the present invention, since the outer surface of the clearance is an inclined surface extending to the end face of the insertion hole, the packing can be smoothly demolded in its manufacturing process. This facilitates the manufacturing of the packing.

Also, according to the present invention, the outer surface of the sliding contact portion is formed as a surface inclined such that the outer diameter of the sliding contact portion is smaller closer to the side on which the clearance is open. As a result, grease is easily led to the outside of the sliding contact portion, and this facilitates storage of the grease.

Also, according to the present invention, since the two ends of the outer surface of the packing have different shapes, the side on which the clearance is open can be visually recognized. This makes it easy to decide the direction in which the packing should be fitted, which helps prevent erroneous fitting of the packing.

Also, according to the present invention, a steam cooking device is provided with a highly airtight packing. This makes it possible to maintain the heating chamber in a super low-oxygen state where the oxygen concentration is on the order of 0.1% during a cooking operation. As a result, oxidation of an article-to-be-heated can be prevented, and thus, destruction of nutrients such as vitamin C can be prevented.

Also, according to the present invention, since the side of the packing on which the clearance is open is located on the side of the motor, the grease stored in the clearance can be prevented from coming in contact with steam. This helps prevent deterioration of the grease due to steam.

Also, according to the present invention, the rotation shaft is inserted through the packing after grease is applied to the circumferential surface of the rotation shaft. In this way, grease can be led to the inside of the packing more easily than in a case in which grease is applied to the inside of the packing.

Figure 1:
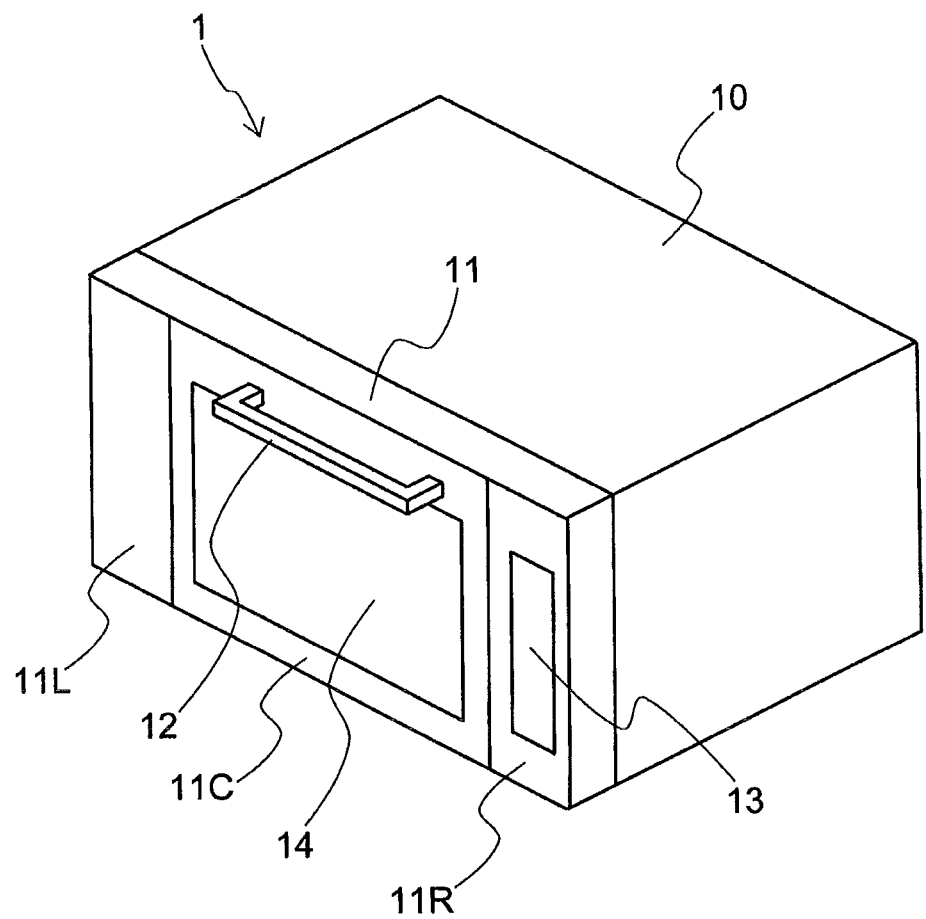
FIG. 1 A perspective view showing a steam cooking device according to an embodiment of the present invention.

LIST OF REFERENCE SYMBOLS 1 steam cooking device
11 door 20 heating chamber
21 plate
27 partition wall
27a through hole
28 inlet port
31 exhaust fan
32, 33 exhaust duct
34 steam supply duct
35 circulation duct
40 steam heating device
41 steam heating heater
47 outer cover
48 damper
50 steam generating device
51 pot
52 steam generating heater
54 water drain valve
55 water supply passage
57 water supply pump
61 jet cover
65, 67 jet port
70 tank case
71 water tank
71a inlet port
80 blower fan
81 motor
81a rotation shaft
81b fixed portion
82 impeller
82a boss
82b blade
82c boss hole
82d screw
83 packing
83a insertion hole
83b sliding contact portion
83c clearance
83d first protruding portion
83e second protruding portion
83f end face
91 temporary reservoir
92 pot water-level detection portion
D rotation shaft diameter
d inner diameter of sliding contact portion
L length of sliding contact portion in axial-direction
F article-to-be-heated
G grease

DETAILED DESCRIPTION OF THE INVENTION

Hereinafter, embodiments of the present invention will be described with reference to the drawings. FIG. 1 is a perspective view showing a steam cooking device according to an embodiment of the present invention. The steam cooking device 1 shown in FIG. 1 is for cooking an article-to-be-heated by using superheated steam. The steam cooking device 1 has a cabinet 10 in the shape of a rectangular parallelepiped, and a door 11 is provided on the front face of the cabinet 10.

The door 11 is supported on the cabinet 10 so as to be pivotable about the bottom edge of the door 11 in a vertical plane, and a handle 12 is fitted in an upper part of the door 11. A middle part 11C of the door 11 has a pane of heat-resistant glass set therein to form a see-through portion 14. On the left and right of the middle part 11C, a left-side part 11L and a right-side part 11R, each finished with a metal decoration plate, are arranged symmetrically. On the right-side part 11R, an operation panel 13 is provided.

Figure 2:
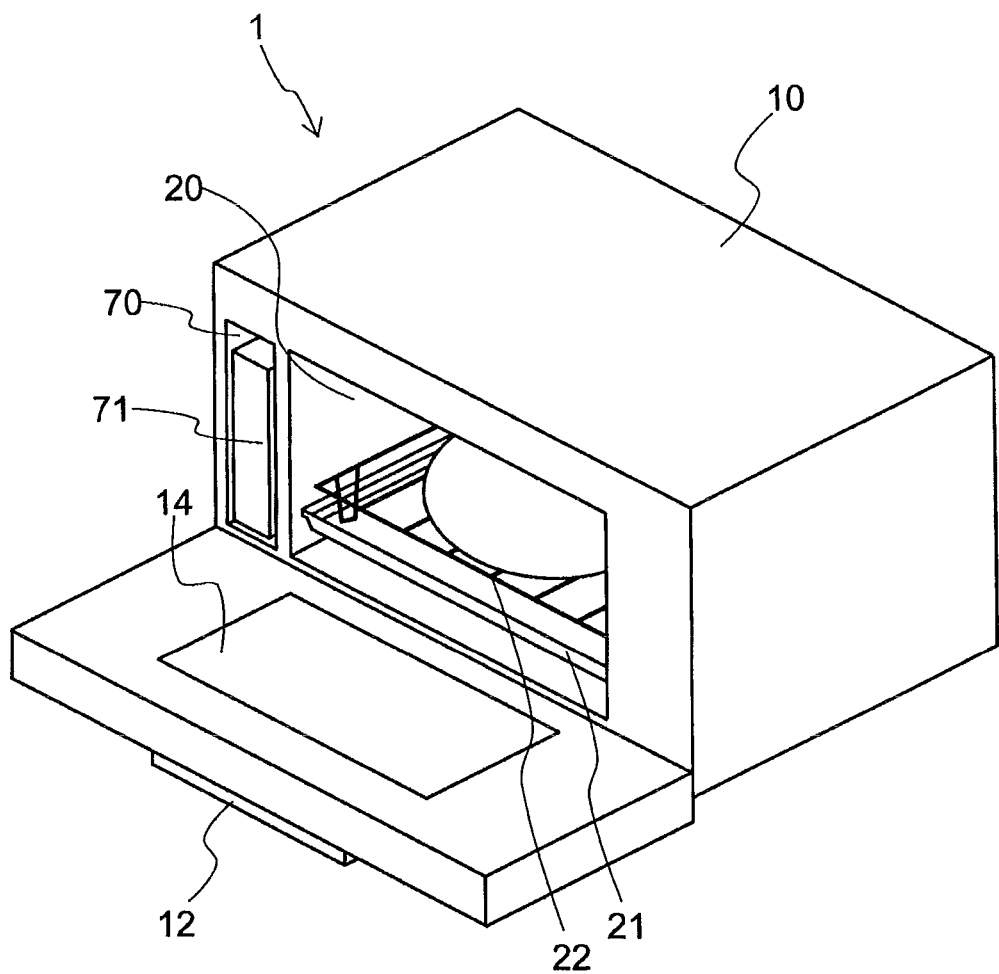
FIG. 2 A perspective view showing a steam cooking device according to an embodiment of the present invention with a door open.

FIG. 2 is a perspective view showing the steam cooking device 1, with the door 11 open. As shown in FIG. 2, when the handle 12 provided in an upper part of the door 11 is held and pulled frontward, the door 11 changes its position through 90° from a vertical, closed state to a horizontal, open state. When the door 11 is open, the front face of the cabinet 10 appears.

A heating chamber 20 is provided in a position corresponding to the middle part 11C of the door 11 in the front face of the cabinet 10 that appears when the door 11 is opened. The heating chamber 20 is formed substantially in the shape of a rectangular parallelepiped, and the front face thereof at which it faces the door 11 is formed as a completely open opening through which an article-to-be-heated F (see FIG. 3) is put in or taken out from the heating chamber 20. The door 11 is rotated to open/close the opening. Wall surfaces of the heating chamber 20 are formed of stainless steel plates, and heat insulation is applied to outer surfaces of the heating chamber 20. The heating chamber 20 is airtight, and is tightly closed when the door 11 is closed. In the heating chamber 20, a tray 21 is placed, and, above the tray 21, a rack 22 formed of stainless steel wire is placed for placing an article-to-be-heated F (see FIG. 3) thereon.

The front face of the cabinet 10 appears when the door 11 is opened, and a part of the front face corresponding to the right-side part 11R of the door 11 is not formed as an opening. Inside this part of the cabinet 10, a control circuit board (not shown) is disposed. On the other hand, inside a part of the front face of the cabinet 10 corresponding to the left-side part 11L of the door 11, a tank case 70 is disposed. In the tank case 70, there is accommodated a water tank 71 in which water for generating steam and water discharged from a steam generating device 50 (see FIG. 3) is stored.

Figure 3:
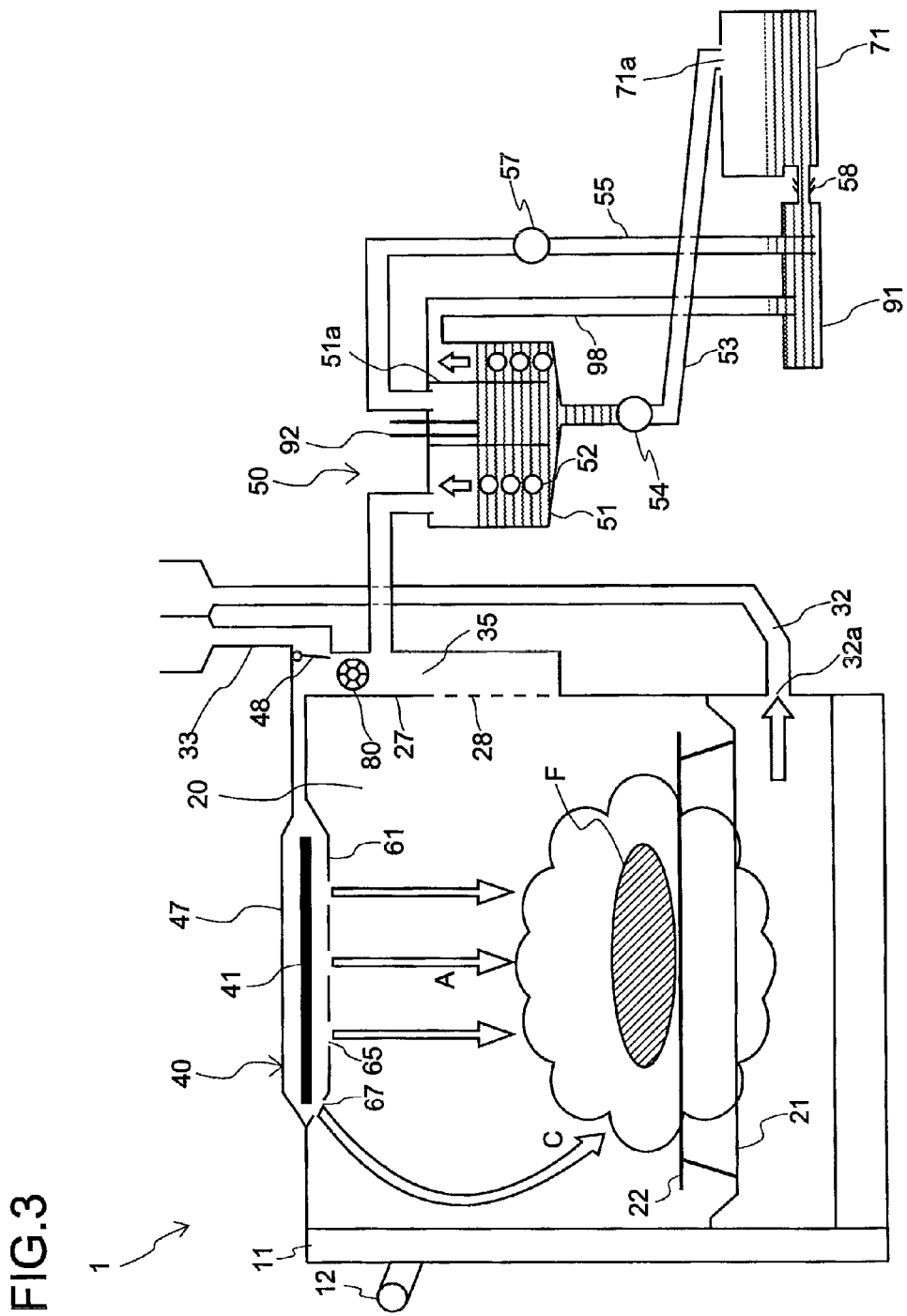
FIG. 3 A diagram schematically showing an inside structure of a steam cooking device according to an embodiment of the present invention.

Next, the inside structure of the steam cooking device 1 will be schematically described with reference to FIG. 3. FIG. 3 is a diagram schematically showing the inside structure of a steam cooking device 1. In the figure, the outline arrow indicates the direction in which steam flows. In the figure, the heating chamber is shown as seen from a side, and for ease of understanding the inside structure of the steam cooking device 1, the water tank 71, the steam generating device 50 and the like are illustrated outside the cabinet 10. In practice, as shown in FIG. 2, the water tank 71 is disposed beside the heating chamber 20 inside the cabinet 10, and the steam generating device 50 is also disposed inside the cabinet 10.

As shown in FIG. 3, the water tank 71 communicates with a temporary reservoir 91 via a joint portion 58 provided in the tank case 70. In this way, the water tank is detachable with respect to the cabinet 10 (see FIG. 2).

A water supply passage 55 extends to the bottom of the temporary reservoir 91 to be immersed therein. Midway in the water supply passage 55, a water supply pump 57 is provided to be connected to the steam generating device 50. The steam generating device 50 has a cylindrical pot 51 whose axial direction is substantially equal to the vertical direction, and when the water supply pump 57 is driven, water is supplied from the water tank 71 to the pot 51.

The pot 51 is formed of a metal, synthetic resin, or ceramic, or of a combination of these different materials, and has thermal resistance. Inside the pot 51, a steam generating heater 52 formed with a spiral sheath heater is immersed therein. When the steam generating heater 52 is energized, the water present in the pot 51 is heated, and thereby steam is generated.

Inside the pot 51, a cylindrical partition 51a is formed to extend from the top surface of the pot 51 into the spiral steam generating heater 52. Inside the partition 51a, a pot water-level detection portion 92 is provided for detecting the water level in the pot. The pot water-level detection portion 92 has a plurality of electrodes, and detects the water level in the pot 51 based on electrical conduction between the electrodes.

The partition 51a is provided for the purpose of making bubbles resulting from the boiling of water less likely to affect the pot water-level detection portion 92. This improves the detection accuracy of the pot water-level detection portion 92.

From the top surface of the pot 51, a steam supply duct 34 extends to be connected to a circulation duct which will be described later. At an upper part of the peripheral surface of the pot 51, an overflow water pipe 98 is provided to be connected to the temporary reservoir 91. Through the overflow water pipe 98, water overflowing from the pot 51 is led to the temporary reservoir 91. The water level at which water overflows from the pot 51 into the overflow water pipe 98 is set higher than the ordinary water level in the pot 51 but lower than the steam supply duct 34.

The pot 51 has a funnel-shaped bottom part, from a lower end of which a water drain pipe 53 extends. Midway along the water drain pipe 53, a water drain valve 54 is provided. The water drain pipe 53 extends to an inlet port 71a of the water tank 71 with a slope of a predetermined angle. The inlet port 71a is provided with a mesh filter (not shown) for filtering out wastes from drained water. Water stored in the pot 51 can be discharged into the water tank 71 by opening the valve 54, and can be discarded by detaching the water tank 71.

A circulation duct 35 is provided from the rear surface to the top surface of the outer wall of the heating chamber 20. Part of the rear wall of the heating chamber 20 is formed open as an inlet port 28 of the circulation duct 35, and the circulation duct 35 is connected to the steam heating device 40 disposed at an upper portion of the heating chamber 20. A lower surface of the steam heating device 40 is covered by a jet cover 61, and an upper surface of the steam heating device 40 is covered by an upper cover 47.

Both upper and lower surfaces of the jet cover 61 are finished to be dark-colored by surface treatment such as painting. As a result, the jet cover 61 can absorb heat radiated from a steam heating heater 41 well, and can radiate heat from the lower surface thereof into the heating chamber 20. Furthermore, the jet cover 61 is formed to protrude to the inside of the heating chamber, has a plurality of jet ports 65 formed in the lower surface thereof, and has a plurality of jet ports 67 formed in a front surface thereof. Although not shown, jet ports are also formed in side surfaces of the jet cover 61.

The steam heating device 40 is provided with the steam heating heater 41 formed with a sheath heater, and further heats steam generated by the steam generating device 50 to generate superheated steam. The steam heating device 40 is disposed, in plan view, in the middle of the ceiling portion of the heating chamber 20. Furthermore, the steam heating device 40 is formed to be smaller in area than the top surface of the heating chamber 20 and small in volume to obtain high heating efficiency.

Inside the circulation duct 35, there is disposed a blower fan 80 formed with a centrifugal fan, and the steam supply duct 34 is connected to an upstream side of the blower fan 80. When the steam blower fan is driven, steam generated by the steam generating device 50 flows into the circulation duct 35 via the steam supply duct 34 to be fitted into the heating chamber 20 through the jet ports 65 and 67. Part of the steam jetted into the heating chamber 20 circulates such that it is sucked through the inlet port 28 to flow through the circulation duct to be jetted out again through the jet ports 65 and 67 of the jet cover 61. Detailed description of the structure of the blower fan 80 will be given later.

Furthermore, an exhaust duct 33 branches out from an upper portion of the circulation duct 35 via a damper 48. The exhaust duct 33 has an open end that is open to the outside, and forcibly discharges gas in the heating chamber 20 when the damper 48 is opened and the blower fan 80 is driven. Moreover, at a lower portion of the heating chamber 20, an exhaust port 32a is formed, and an exhaust duct 32 extends from the exhaust port 32a. The exhaust duct 32 is formed of metal such as stainless steel, and has an open end open to the outside, through which the exhaust duct 32 naturally exhausts gas in the heating chamber out of the device.

In an ordinary state, that is, in a state in which steam cooking is not being performed, air is dominant inside the heating chamber 20. On the other hand, when steam cooking is started, as described above, superheated steam is jetted into the heating chamber 20, and air and steam is exhausted out of the heating chamber 20. As a result, a steam atmosphere is achieved in the heating chamber 20. Oxygen in the air has been sufficiently exhausted in this state, and this helps reduce oxidation of the article-to-be-heated F.

The steam cooking device 1 may also be provided with a magnetron so that cooking can also be performed by using a microwave. When cooking is performed by using a microwave, outside air is sucked in via the exhaust duct 32.

Figure 4:
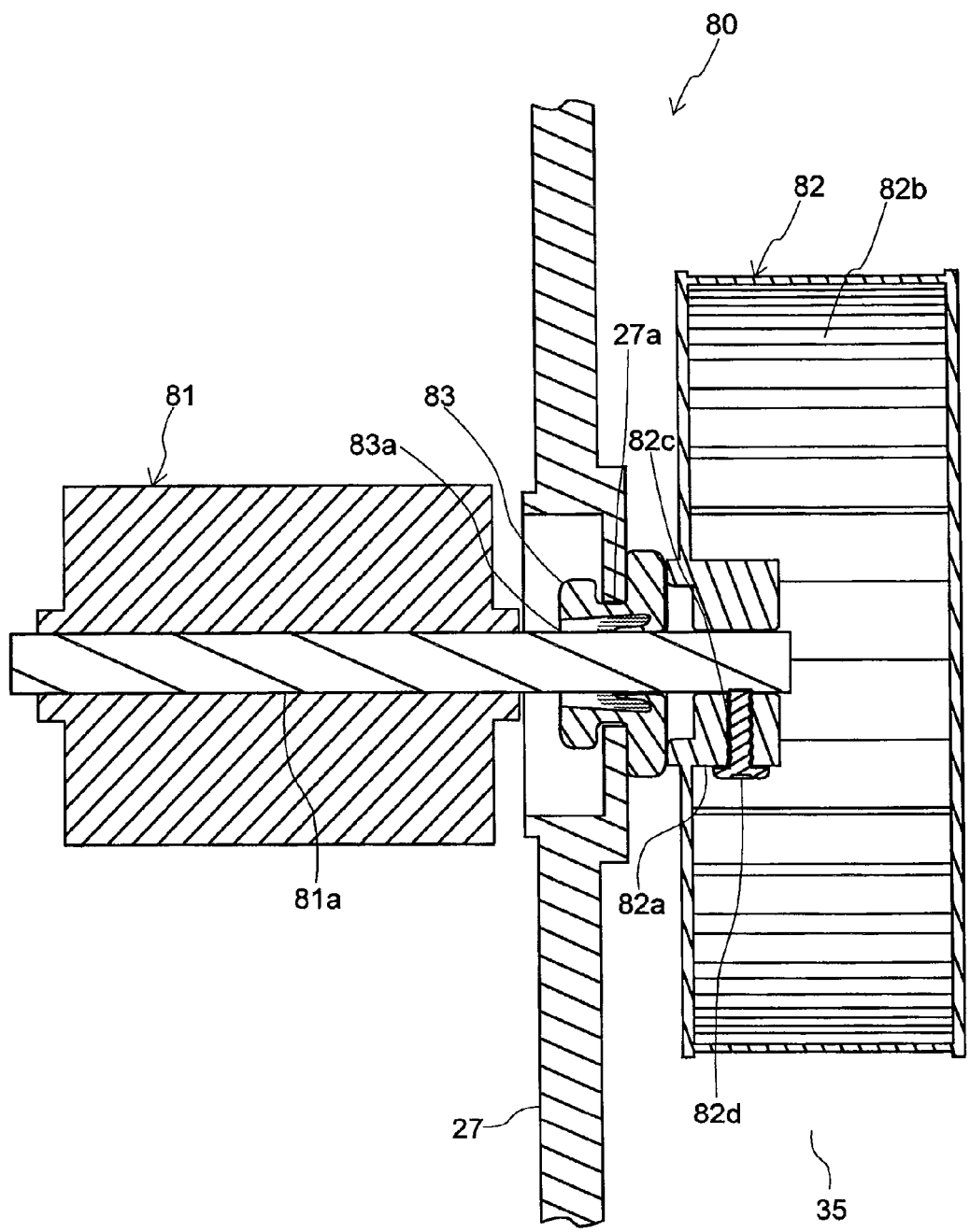
FIG. 4 A sectional view showing a blower fan in a steam cooking device according to an embodiment of the present invention.

FIG. 4 is a sectional view showing the blower fan 80 of this embodiment. The blower fan 80 is provided with a motor 81 and an impeller 82. The impeller 82 is disposed inside the circulation duct 35, and the motor 81 is disposed outside the circulation duct 35. A partition wall 27 of the circulation duct 35 isolates the motor 81 from the circulating gas. A through hole 27a is formed in the partition wall 27, and packing 83 is fitted to the through hole 27a. The packing 83 is a flexible member formed of a fluororubber, a tetrafluoroethylene resin (PTFE), or the like by a method such as mold processing. In the packing 83, an insertion hole 83a is formed, and a rotation shaft 81a of the motor 81 is inserted into the insertion hole 83a.

The impeller 82 is composed of a boss 82a disposed at the center and a plurality of blades 82b arranged along a circumference of the boss 82a. The boss 82a has a cylindrical shape, and the rotation shaft 81a is fitted into the boss 82a. In the boss 82a, a boss hole 82c is formed to penetrate through the boss 82a. A screw 82d is screwed into the boss hole 82c to pressed the rotation shaft 81a. In this way, the boss 82a and the rotation shaft 81a are fixed to each other.

A magnetic field is generated when power is supplied to the motor 81, and the motor 81 rotates the rotation shaft 81a by magnetic force. The rotation of the rotation shaft 81a makes the impeller 82 rotate. The rotation of the impeller 82 makes gas flow in the circulation duct 35, and as a result, pressure is lower inside the partition wall 27 than outside the partition wall 27. In this state, the packing 83 prevents air from flowing to the inside of the partition wall from the outside thereof.

Figure 5A:
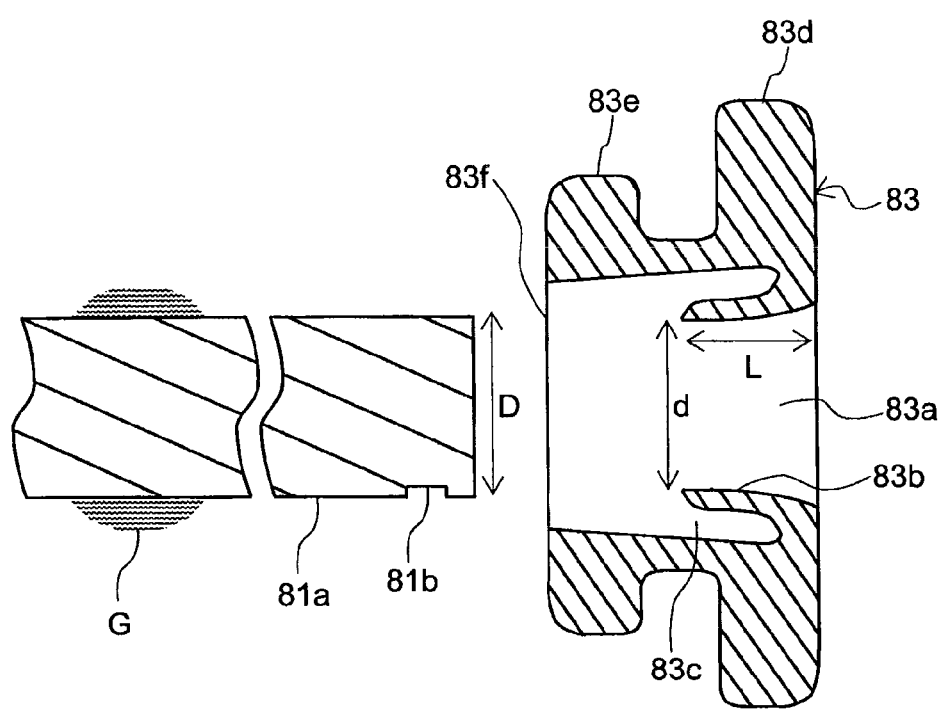
FIG. 5A A sectional view showing packing and a rotation shaft in a steam cooking device according to an embodiment of the present invention.
Figure 5B:
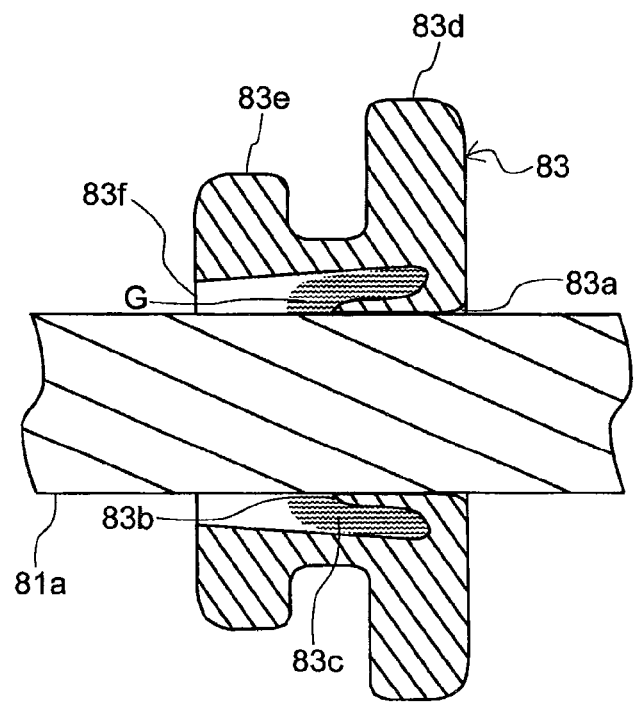
FIG. 5B A sectional view showing packing and a rotation shaft in a steam cooking device according to an embodiment of the present invention.
Figure 6:
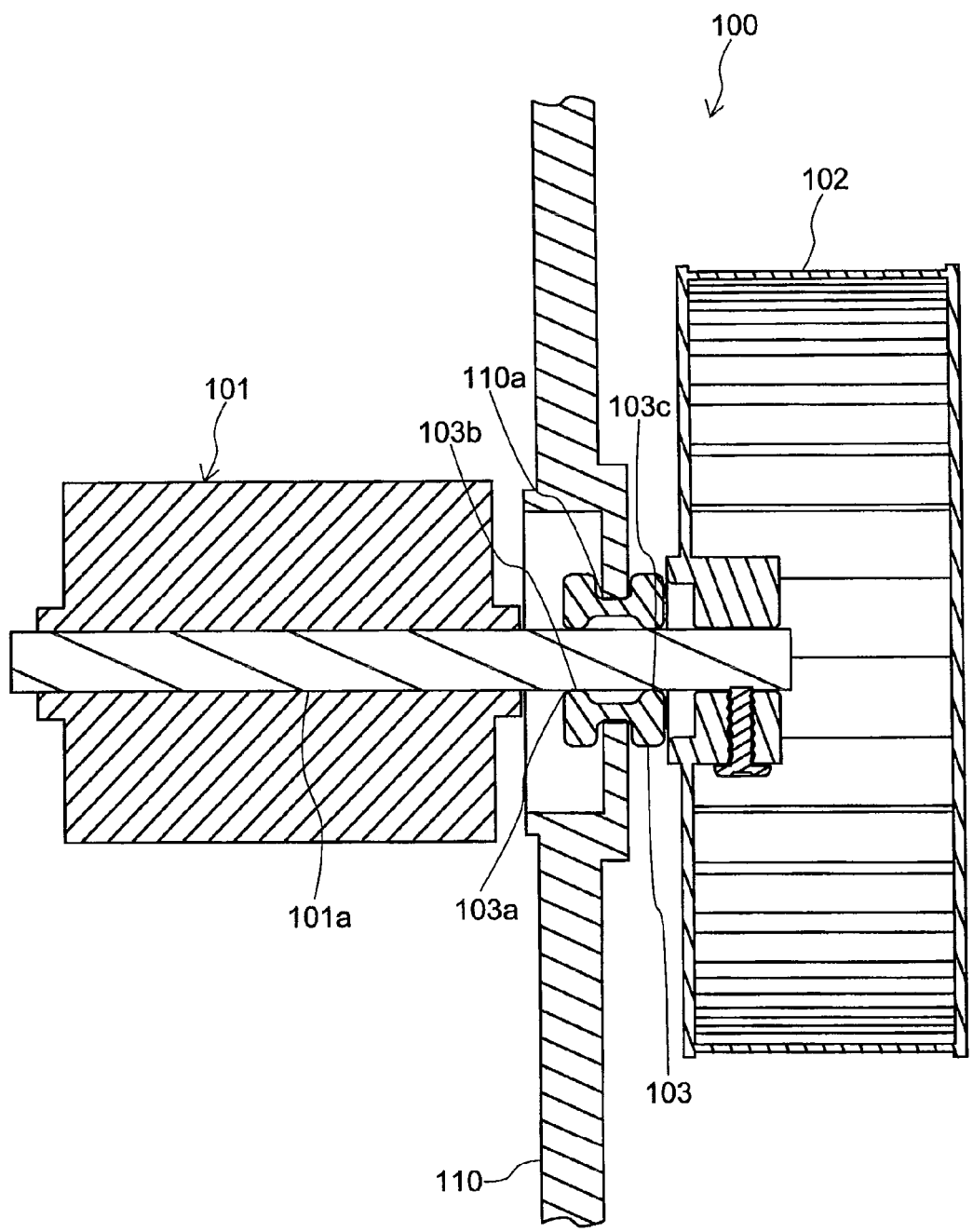
FIG. 6 A sectional view showing a blower fan in a conventional steam cooking device.

FIGS. 5A and 5B are sectional views showing the packing 83 and the rotation shaft 81a. As shown in FIG. 5A, in the insertion hole 83a formed in the packing 83, there is provided a sliding contact portion 83b having a surface with which the rotation shaft 81a is in sliding contact. Furthermore, a clearance 83c is formed with a surface that is not in contact with the rotation shaft 81a. An end of the clearance 83c in an axial direction is open, and part of the clearance 83c extends over the outer surface of the sliding contact portion 83b. And, the sliding contact portion 83b is supported in the packing 83 at another end of the clearance that is not open.

A width of the sliding contact portion 83b in an axial direction is formed smaller than a width of the insertion hole 83a in an axial direction. An end face 83f of the clearance 83c on the side at which the clearance 83c is open is narrow. A diameter of the end face 83f located on the side at which the clearance 83c is open is made wider than the outer diameter of the sliding contact portion 83b.

At both ends of the packing 83, first and second protruding portions 83d and 83e are respectively provided protruding outward in the diameter direction. Between the first and second protruding portions 83d and 83e, the partition wall 27 (see FIG. 4) is disposed, and thereby the packing 83 is fitted to the partition wall 27 (see FIG. 4). An outer diameter of the second protruding portion 83e provided at an end portion of the packing 83 on which the clearance 83c is open is smaller than an outer diameter of the first protruding portion that is provided on the other end portion. This makes it easy to recognize the side at which the clearance 83c is open by merely looking at the packing 83. As a result, the packing 83 can be fitted in a correct direction in the manufacturing process of the steam cooking device 1 (see FIG. 4), and this helps reduce the number of steps in the manufacturing process. Note that the outer diameter of the second protruding portion 83e may be larger than that of the first protruding portion 83d. Also, since the side on which the clearance 83c is open can be easily recognized as long as the two ends of the outer surface of the packing have different shapes, the outer surface of the packing may have any shape other than the above described shape protruding outward in the diameter direction.

At an end portion of the rotation shaft 81a, a depressed fixing portion 81b is provided to thereby fix the rotation shaft 81a to the impeller 82. The rotation shaft 81a is inserted into the packing 83 from the end thereof at which the fixing portion 81b is formed. At this time, the rotation shaft 81a is inserted into the end face 83f located on the side at which the clearance 83c is open. Grease G has been applied to the circumferential surface of the rotation shaft 81a. The grease G is applied to the circumferential surface of the rotation shaft 81a particularly at a portion that comes in contact with the rotatable contact portion 83b when the rotation shaft 81a is fitted in position.

Assuming that a diameter D of the rotation shaft 81a is 4 mm, an inner diameter d of the sliding contact portion 83b is preferably on the order of 3.95 to 4.15 mm. A length L of the sliding contact portion 83b in an axial direction is preferably 2 to 3 mm, and more preferably, 3 mm. A thickness of the sliding contact portion 83b is preferably 0.3 to 0.7 mm, and more preferably, 0.3 mm. A thickness of the clearance 83c is preferably 0.5 to 0.8 mm. Hardness of the flexible material of which the packing 83 is formed is preferably 65 to 70 degrees of rubber hardness (JIS K 6253).

As shown in FIG. 5B, when the rotation shaft 81a is inserted into the packing 83, part of the grease G is scraped off by the sliding contact portion 83b. The grease G that is scraped off at this time is stored in the clearance 83c. As a result, a sufficient amount of grease G is stored in the insertion hole 83a of the packing 83. Also, since the outer peripheral surface of the sliding contact portion 83b is formed as a surface inclined such that the outer diameter of the sliding contact portion is smaller closer to the side on which the clearance is open, grease G can be easily stored in the clearance 83c.

Also, the clearance 83c is made narrow at the end face 83f located on the side at which the clearance 83c is open. This prevents the grease G from leaking from inside to outside of the packing 83. Furthermore, this prevents mixing-in of foreign substances from outside the packing 83. Here, in the packing 83, the outer surface of the clearance 83c is formed as a smooth inclined surface extending to the end face of the insertion hole 83a, and furthermore, the packing 83 is formed of a flexible material. This prevents the packing 83 from being stuck when it is taken out from the mold after being molded. This facilitates the manufacturing of the packing 83.

Next, the operation of the steam cooking device 1 will be described referring to FIGS. 1 to 4 and FIGS. 5A and 5B mentioned above. First, in the steam cooking device 1 having the above structure, the door 11 is opened and the water tank 71 is taken out from the tank case 70. At this time, the joint portion 58 is disengaged and a water stop valve is closed. The water tank 71 is carried by a user to where the user fills it with, for example, tap water.

Then the user carries the water tank 71 back to the steam cooking device 1 to insert it into the tank case 70. At this time, the water tank 71 is connected to the temporary reservoir 91 by the joint portion 58, and the water stop valve is opened.

The user puts the article-to-be-heated F on the rack 22, closes the door 11, selects an option from a menu by operating an operation panel 13, and presses down a start key (not shown). Thereby, a sequence of cooking is started, and the operation of the water supply pump 57 is started to supply water to the steam generating device 50. At this time, the water drain valve 54 is in a closed state.

With the water supply pump 57 driven, water is supplied into the pot 51 through the water supply passage 55 to a predetermined water level, and then the water supply is stopped. With a predetermined amount of water in the pot 51, the steam generating heater 52 is energized to directly heat the water present in the pot 51.

The blower fan 80 and the steam heating heater 41 are energized when the steam generating heater 52 is energized, or when the temperature of the water in the pot 51 reaches a predetermined level. With the blower fan 80 driven, steam in the heating chamber 20 is sucked into the circulation duct 35 from the inlet port 28. When the water present in the pot 51 boils, steam of 1 atmosphere pressure and of a temperature of 100° C. is generated, and saturated steam flows into the circulation duct 35 via the steam supply duct 34. At this time, the damper 48 is in a closed state. The steam is forced by the blower fan 80 to flow through the circulation duct 35 and then into the steam heating device 40.

The steam that has flown into the steam heating device 40 is heated by the steam heating heater 41 to become superheated steam having a temperature of 100° C. or higher. Typically used is superheated steam heated to 150 to 300° C. Part of the superheated steam is jetted in a straight downward direction (the direction indicated by arrow A) from the jet ports 65. Thereby, a top surface of the article-to-be-heated F comes into contact with the superheated steam.

Part of the superheated steam is jetted sideways in an obliquely-downward direction from the jet ports formed in the side surfaces of the jet cover 61. The superheated steam jetted sideways is reflected on a reflection portion (not shown) formed as a depression in a side wall of the heating chamber 20, to be led below the article-to-be-heated F. Thereby, a lower surface of the article-to-be-heated F comes into contact with the superheated steam.

When the temperature of the surface of the article-to-be-heated F is 100° C. or lower, the superheated steam is condensed on the surface of the article-to-be-heated. At this time, a large amount of heat is applied in the form of condensation heat, which is as large as 539 cal/g, and thereby the article-to-be-heated F can be heated quickly.

Also, part of the superheated steam is jetted in an obliquely downward direction toward the door 11 (the direction indicated by arrow C) from the jet ports 67 formed in the front surface of the jet cover 61. The steam present in the heating chamber 20 is sucked from the inlet port 28 by the blower fan 80. In the blower fan 80, the motor 81 drives the impeller 82 to rotate, to thereby suck the steam out from the heating chamber 20. At this time, pressure inside the partition wall 27 becomes lower than outside the partition wall 27, and thus, air tries to flow to the inside of the partition wall 27. However, since the packing 83 is fitted into the through hole 27a and the sliding contact portion 83b is in sliding contact with the rotation shaft 81, the through hole 27a is sealed. Thereby, outside air is prevented from flowing into the circulation duct 35.

The flow of the superheated steam jetted frontward is bent by the sucking force from the blower fan 80, to be led backward. Thereby, part of the superheated steam hits a front portion of the top surface of the article-to-be-heated F, and part of the superheated steam is led from the front side to below the article-to-be-heated F. As a result, the superheated steam is fully distributed in a front portion of the heating chamber 20, and this prevents the front portion of the article-to-be-heated F from being undercooked, and thus the article-to-be-heated F can be uniformly cooked.

Also, since the superheated steam is sucked from the heating chamber 20 via the inlet port 28, a smaller amount of the superheated steam, which is hot, directly hits the door 11. This prevents the door 11 from being heated too much and thus eliminates the need of using a door with high resistance to heat as the door 11, preventing cost increase of the steam cooking device 1.

When an amount of steam present in the heating chamber 20 increases with time, excessive steam is exhausted from the device through the exhaust duct 32.

The superheated steam jetted from the jet ports 65 and 67 is, after heating the article-to-be-heated, sucked from the inlet port 28 into the circulation duct 35 and flows into the steam heating device 40. In this way, the steam inside the heating chamber 20 repeatedly circulates to during a cooking operation. Also, when the pot water-level detection portion 92 detects that the water level in the pot 50 has been lowered, the water supply pump 57 is driven to supply water to the pot 51 from the temporary reservoir 91.

When the cooking is finished, it is indicated by a message displayed on a display portion of the operation panel 13 or by an audible alert. When the user, being notified that the cooking is finished, opens the door 11, the damper 48 opens to forcibly exhaust the steam from inside the heating chamber 20 rapidly. This allows the user to safely take out the article-to-be-heated F from inside the heating chamber 20 without coming into contact with hot steam.

When the cooking is finished, the water drain valve 54 opens as well. This allows water remaining in the steam generating device 50 to be drained therefrom to flow through the water drain pipe 53 into the water tank 71 via the inlet port 71a. The water remaining in the steam generating device 50 may be drained after it is naturally cooled down or forcibly cooled down by using a fan or the like. Furthermore, the user may be allowed to select between natural cooling down and forcible cooling down.

According to this embodiment, the grease G introduced to the inside of the packing 83 is scraped off by the sliding contact portion 83b and stored in the clearance 83c. As a result, most part of the grease G applied to the peripheral surface of the rotation shaft 81a is stored inside the packing 83. This helps reduce friction noise and friction heat caused by reduction of the grease G inside the packing 83 to an insufficient amount. Friction noise and friction heat can also be reduced by making the width of the sliding contact portion 83b in the axial direction smaller than that of the insertion hole 83a in the axial direction.

And, since friction noise and friction heat can be reduced in this way, the sliding contact portion 83b and the rotation shaft 81a can be designed to be in closer contact with each other. This helps prevent air from outside to inside of the partition wall 27, to thereby improve airtightness. As a result, the heating chamber can be maintained in a super low-oxygen state where the oxygen concentration is on the order of 0.1% during a cooking operation. This helps prevent oxidation of the article-to-be-heated F to thereby prevent destruction of nutrients such as vitamin C. This further helps reduces oxidation of polyphenols, which have antioxidant characteristics and inhibit oxidation of accumulated bad LDL cholesterol, to thereby prevent disorders such as hyperpiesia, arteriosclerosis, and cerebrovascular disorder and cardiac diseases caused by arteriosclerosis.

Also, part of the sliding contact portion 83b outwardly protrudes in the diameter direction and the rotation shaft 81a is in sliding contact with the inner side of the sliding contact portion 83b. This makes it possible for the sliding contact portion 83b to deal with the runout of the rotation shaft 81a by easily changing its shape on receiving contact pressure from the rotation shaft 81a. This helps prevent a gap between the rotation shaft 81a and the sliding contact portion 83b without increasing the contact pressure, to thereby enhance the closeness of contact between the rotation shaft 81a and the sliding contact portion 83b. This also helps reduce friction between the rotation shaft 81a and the sliding contact portion 83b when runout of the rotation shaft 81a has occurred.

The packing 83 may be fitted in a reverse direction, and a shaft extending from the impeller 82 may be inserted through the packing 83 from the end face 83f located on the side on which the clearance 83c is open, to be connected to the rotation shaft 81a. With this structure, the packing 83 is disposed with the end face 83f, which is located on the side on which the clearance 83c is open, facing the inner surface of the partition wall 27. However, it is preferable that the end face 83f located on the side on which the clearance 83c is open face the inner surface of the partition wall 27 as in this embodiment. This is because, if the end face 83f located on the side on which the clearance 83c is open faces the outside of the partition wall 27, the grease G stored in the clearance 83c can be prevented from coming into contact with steam. As a result, deterioration of the grease G due to steam can be prevented.

In this embodiment, the blower fan 80 is formed as what is called a sirocco fan provided with the impeller 82 having the plurality of blades 82b arranged along the outer periphery thereof, but a fan of a different type such as a propeller fan or a turbo fan may be used. The impeller 82 may be disposed inside the heating chamber 20. In such a structure, a wall surface of the heating chamber 20 functions as a partition wall to isolate the motor 81 from circulating gas.

INDUSTRIAL APPLICABILITY

The present invention can be applied to a steam cooking device that jets steam into a heating chamber to thereby cook an article-to-be-heated and to a manufacturing method of such a steam cooking device. The present invention can also be applied to a packing with improved airtightness.

The invention claimed is:

1. A packing for holding a shaft that, in a state in which a rotation shaft is inserted into an insertion hole formed in the packing, rotatably holds the rotation shaft, wherein an inside of the insertion hole which faces the rotation shaft comprises:
a sliding contact portion extending from an inner surface of the insertion hole along an axial direction of the rotation shaft and having a first surface that is in sliding contact with the rotation shaft,
wherein the inner surface of the insertion hole and a second surface of the sliding contact portion define a clearance, an end of which in the axial direction is open,
wherein part of the clearance extends over the second surface of the sliding contact portion,
wherein an outer diameter of the sliding contact portion reduces as the sliding contact portion extends toward the end of the clearance, and
wherein the clearance becomes smaller as the clearance extends toward an end of the clearance at which the clearance is open.

2. The packing according to claim 1, wherein the inner surface of the insertion hole that defines the clearance is an inclined surface that extends to an end face of the insertion hole.

3. The packing according to claim 2, wherein the second surface of the sliding contact portion that defines the clearance is formed as a surface inclined such that the outer diameter of the sliding contact portion becomes smaller as the sliding contact portion closer to the end of the clearance at which the clearance is open.

4. The packing according to claim 3, wherein two ends of an outer surface of the packing have different shapes.

5. A steam cooking device, comprising:
the packing according to claim 1;
a heating chamber having airtightness;
a steam generating device that generates steam, and jets the steam into the heating chamber;
a motor provided with the rotation shaft;
a blower fan having an impeller rotated by the motor to circulate gas in the heating chamber; and
a partition wall that has a through hole that the rotation shaft penetrates, that is located between the motor and the impeller, and that isolates the motor from circulating gas,
wherein
the through hole is sealed with the packing through which the rotation shaft is inserted.

6. The steam cooking device according to claim 5, wherein
the packing is disposed such that the end of the clearance at which the clearance is open is located on a side of the motor.

7. A method for manufacturing a steam cooking device including the packing according to claim 1, an airtight heating chamber, a steam generating device that generates steam and jets the steam into the heating chamber, a motor provided with the rotation shaft, a blower fan having an impeller rotated by the motor to circulate gas in the heating chamber, and a partition wall that has a through hole that the rotation shaft penetrates, that is located between the motor and the impeller, and that isolates the motor from circulating gas, the through hole being sealed with the packing through which the rotation shaft is inserted,
the method comprising steps of:
applying grease to a circumferential surface of the rotation shaft; and
inserting the rotation shaft, to the circumferential surface of which the grease is applied, through the packing starting at an end of the packing on a side on which the clearance is open.

* * * * *